T. B. HUESTIS.
PNEUMATIC TIRE VALVE.
APPLICATION FILED MAR. 18, 1908.
917,071.
Patented Apr. 6, 1909.
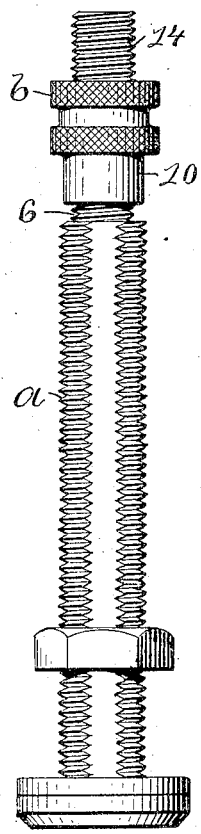
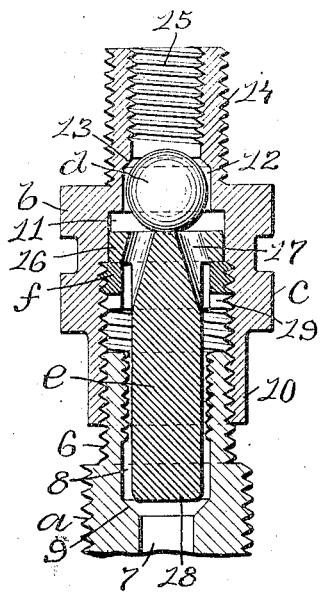
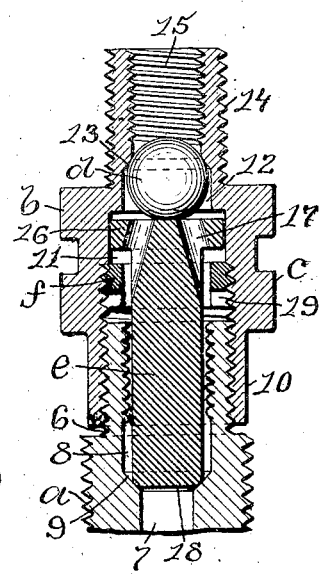
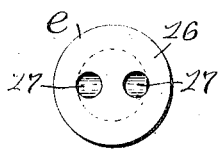
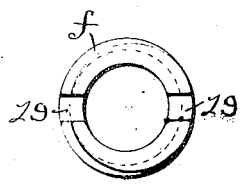
WITNESSES:
Chas. H. Luther
Ada E. Fagerty
INVENTOR:
Thomas B. Huestis
By Joseph B. Miller
ATTORNEY.

UNITED STATES PATENT OFFICE.

THOMAS B. HUESTIS, OF BRISTOL, RHODE ISLAND.

PNEUMATIC-TIRE VALVE.

No. 917,071.

Specification of Letters Patent.

Patented April 6, 1909.

Application filed March 18, 1908. Serial No. 421,879.

*To all whom it may concern:*

Be it known that I, THOMAS B. HUESTIS, a citizen of the United States, residing at Bristol, in the county of Bristol and State of Rhode Island, have invented a new and useful Improvement in Pneumatic-Tire Valves, of which the following is a specification.

This invention has reference to an improvement in pneumatic tire valves and more particularly to an improvement in emergency valve nipples for pneumatic tire valves.

In the use of pneumatic tire valves the small internal parts of the valve are liable to get out of order or broken, thereby ruining the utility of the valve. This generally requires a new valve which necessitates the removal of the tire from the wheel with consequent loss of time.

The object of my invention is to provide an emergency valve nipple, whereby in case of accidents or failure of the tire valve to properly work, the valve nipple may be applied to the tire valve and the tire inflated in the usual way.

A further object of my invention is to construct an emergency valve nipple so that when in use the valve stem is provided with a ball check valve and a positive double closure valve.

My invention consists in the peculiar and novel construction of an emergency valve nipple for pneumatic tire valves, said valve nipple having a ball check valve, a double nipple closure valve and details of construction, as will be more fully set forth hereinafter and claimed.

Figure 1 is a vertical side view of a pneumatic tire valve provided with my improved emergency valve nipple. Fig. 2 is an enlarged longitudinal sectional view through the emergency valve nipple and the end of the valve stem with the valves in the open position for inflating the tire. Fig. 3 is an enlarged sectional view similar to Fig. 2, showing the valves in the closed positions. Fig. 4 is an enlarged end view of the loose valve stem removed from the nipple, and Fig. 5 is an enlarged end view of the retaining ring removed from the nipple.

In the drawings, *a* indicates a well known form of pneumatic tire valve stem, and *b* my improved emergency valve nipple.

The valve stem *a* has the usual contracted screw-threaded end 6 for a dust cap, (not shown) and a central longitudinal hole 7 merging into a larger screw-threaded hole 8 which extends in from the end of the stem and forms an annular valve seat 9 in the valve stem *a*, as shown in Fig. 2. The air pipe connection is usually secured to the end of the stem *a* in the screw-threaded hole 8 in the end of the stem.

The emergency valve nipple *b* consists of a cylindrical body member *c* in which is a ball check valve *d*, a loose valve stem *e* and a retaining ring *f*, as shown in Fig. 2. The body member *c* is constructed to have the internally-screw-threaded end 10 adapted to screw onto the end 6 of the valve stem *a*, the central cylindrical chamber 11 merging into the smaller ball valve chamber 12 having the valve seat 13, and the externally-screw-threaded end 14 adapted to receive a dust cap and having the screw-threaded hole 15 which extends into the ball valve chamber 12 and is adapted to receive the usual air pipe connection. The ball valve *d* has a loose fit in the valve chamber 12 and an air tight fit on the valve seat 13.

The loose valve stem *e* has the enlarged circular head 16 in which are the two air ducts 17 17, a flat opposite valve end 18 adapted to have an air tight fit on the valve seat 9 in the valve stem *a* and is loosely held in position by the screw-threaded retaining ring *f* which has the notches 19 19 for removing or securing the ring, as shown in Figs. 2 and 5. The stem *e* when in its operative position has a loose fit in the hole 8 in the end of the valve stem.

When in use the emergency valve nipple *b* is first screwed onto the end 6 of the valve stem *a* into approximately the position, as shown in Fig. 2. The air pipe connection is now secured by screwing it into the screw-threaded hole 15 in the nipple and the tire inflated through the emergency nipple *b*. The ball valve *d* now acts on the valve seat 13 as a check valve to prevent the escape of air from the tire. When the tire is fully inflated the nipple *b* is screwed down to its limit, thereby closing the flat valve end 18 of the loose valve stem *e* on the valve seat 9 in the pneumatic tire valve stem *a* and closing the ball valve *d* onto the valve seat 13 in the nipple *b*, as shown in Fig. 3. A dust cap may now be screwed onto the screw-threaded end 14 of the nipple *b*. The emergency nipple *b* is used ordinarily to temporarily repair the tire valve but it may form a permanent part of the valve.

Having thus described my invention, I claim as new and desire to secure by Letters Patent;

1. An emergency valve nipple consisting of a cylindrical body having an internal screw-threaded end for securing the nipple to the screw-threaded end of a pneumatic tire valve, an internally and externally screw-threaded end for an air pipe connection, and for a dust cap, a ball valve in the nipple, a loose valve stem supporting the ball valve, and a retaining ring adapted to hold the valve stem against downward movement in its operative position in the nipple.

2. An emergency valve nipple $b$ consisting of a cylindrical body member $c$ having the internally screw-threaded end 10, the central chamber 11, the valve chamber 12, the valve seat 13, the externally screw-threaded end 14 in which is the screw-threaded hole 15, a ball valve $d$ in the valve chamber 12, a loose valve stem $e$ having the enlarged circular head 16 in which are the air ducts 17 17 and a flat opposite end 18, and a retaining ring $f$ having the notches 19 19 for removing or securing the ring in the body member $c$.

3. A valve nipple composed of a body having an interior chamber, a valve seat at the top end of the chamber, a ball valve to engage said valve seat, a loose valve stem in said chamber having an enlarged head thereon formed with air ducts, and means in said chamber to engage the under face of said head of the loose valve stem, the top face of said head supporting said ball valve.

4. A valve nipple composed of a body having an interior chamber having screw threads therein, a valve seat at the top end of said chamber, a ball valve to engage said seat, a loose valve stem in said chamber, said valve stem at its lower end being for engagement with the valve seat in the valve stem of a pneumatic tire valve, said valve stem having an enlarged head formed with air ducts which extend therethrough, said ball valve seating on and being supported by said head, and a ring in said chamber threaded into engagement with said screw threads thereof, said ring engaging the under face of said head and thereby restricting the downward movement of said loose valve stem.

5. A valve nipple composed of a body having an interior chamber, said chamber terminating at one end in a valve seat, a pair of independent valves in said chamber which valves are free of permanent connection with each other and being arranged in superimposed relation whereby the upper valve receives support from the lower valve, the upper valve being for engagement on said valve seat, and the lower valve at its lower end being for engagement with the valve seat in the valve stem of a pneumatic tire valve, and means to engage the lower valve to sustain the same against downward movement.

In testimony whereof I have signed my name to this specification in the presence of two subscribing witnesses.

THOMAS B. HUESTIS.

Witnesses:
ADA E. HAGERTY,
J. A. MILLER.